April 11, 1939.  A. L. FREEDLANDER  2,153,664
STRAINER
Original Filed March 8, 1937

INVENTOR.
ABRAHAM L. FREEDLANDER,
BY Toulmin & Toulmin
ATTORNEYS.

Patented Apr. 11, 1939

2,153,664

UNITED STATES PATENT OFFICE 2,153,664

STRAINER

Abraham Lincoln Freedlander, Dayton, Ohio, assignor to The Dayton Rubber Manufacturing Company, Dayton, Ohio, a corporation of Ohio Original application March 8, 1937, Serial No. 129,628, now Patent No. 2,127,397, dated August 16, 1938. Divided and this application June 24, 1937, Serial No. 150,154

2 Claims. (Cl. 210—164)

This invention relates to strainers and particularly to combined strainers and gaskets.

It is an object of this invention to provide a combined strainer and gasket, in which the gasket, in addition to performing its normal function, also performs the function of supporting the strainer, of locating the strainer, and providing a resilient support therefor, whereby to relieve the strainer from unnecessary wear and damage resulting from shock produced by the striking thereagainst of particles prevented, by the strainer, from flowing therethrough.

It is a further object of this invention to provide an integral structure having the properties and advantages of a strainer and the properties and advantages of a resilient gasket.

It is a further object of this invention to provide such structure which comprises a strainer member of metal mesh provided with a resilient supporting annulus integrally secured thereto.

It is a further object of this invention to provide such strainer structures which are particularly adapted for use in conduits for oil, gasoline and the like.

It is a further object of this invention to provide such a combined strainer and gasket structure which is particularly adapted for use between the threaded end portions of hose nozzles and attached hoses.

It is a further object of this invention to provide means for integrally securing an annular gasket member to a non-circular strainer member of metal screen mesh.

These and other objects and advantages will appear from the following description taken in connection with the drawing.

This application is a division of my application Serial No. 129,628, filed March 8, 1937, which matured into Patent No. 2,127,397, August 16, 1938.

Figure 1:
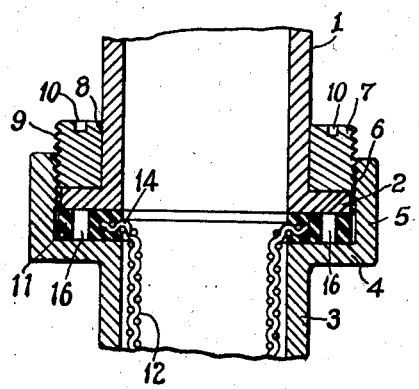
Figure 1 is a fragmentary sectional view of a combined strainer and supporting gasket as applied to a known form of conduit connection.

Referring to the drawing in detail, 1 designates a known form of pipe or conduit provided at its end with an outwardly extending annular flange 2. Adapted to be connected to the member 1 is the member 3 provided with an outwardly extending step 4, from which extends upwardly a substantially cylindrical wall 5 having internal threads designated 6. The annular member 7 is provided with a smooth central bore 8 adapted to closely engage the exterior side walls of the member 1, and the outer surface of the member 7 is provided with screw threads 9 adapted to engage the screw threads 6 in the member 3. 10 designates apertures in the top surface of the member 6, which are adapted to be engaged by a suitable spanner wrench.

The above-described structure is merely one of the conventional forms of connecting means, with which the combined gasket and strainer construction, hereinafter described, is suitable for use, and it is to be clearly understood that the flange or step portion 4 of the member 3 and the flange 2 of the member 1 may be provided with suitable spaced bolt holes adapted to receive clamping bolts for securing the members 1 and 3 together. Likewise, either of the members 2 or 4 may be provided with rigidly attached studs which are adapted to be received in suitably spaced holes in the other of these members and which are likewise adapted to have their free or screw-threaded ends engaged by suitable nuts.

The combined gasket and strainer construction comprises the annular body 11 of rubber, synthetic rubber or other suitable resilient material which has formed or bonded therein an annular outwardly directed flange 14 of the substantially cup-shaped strainer member 12 which is formed of metallic strainer mesh. The flange portion 14 of the mesh member is provided at arcuately spaced points with peripheral cut-away portions or apertures 15 which are adapted to be filled with rubber or other resilient material when the bonding is accomplished; and this construction provides a plurality of peripherally disposed arcuately spaced rubber members extending through the cut-away portions or apertures 15 which preclude the separation of the portions of the resilient body 11 and which cooperate with the annular zones of the body 11 at each side of the flange 14 to support the flanged and cut-away portions of the strainer member 12 resiliently against movement, either axially, radially or in rotary direction with respect to the members 1 and 3.

The resilient material of the body 11 is preferably vulcanized to the flanged portion of the strainer member 12 to form an integral structure and it is, of course, to be understood that, while rubber is a preferred material for forming the body 11, other suitable resilient materials, such as synthetic rubber, may be utilized for this purpose. It is preferred that suitable apertures for receiving connecting bolts be provided in the portions of the solid resilient material extending through cut-away portions 15 and these apertures may serve the purpose of receiving clamping bolts in connections where such are utilized for clamping purposes, in which case they provide for definite alignment of the combined gasket and strainer structure in its proper position. These apertures 16 are likewise advantageous when used with connection structures such as that illustrated in Figure 1, in which case they provide, in effect, small air cushions between the flange 2 and step 4 which, upon compression, have their air containing volumes decreased to place the trapped air in compression. This increases the resiliency with which the strainer member is supported and increases the resistance of the combined strainer and gasket structure to misalignment, either radially or in rotary direction.

Figure 2:
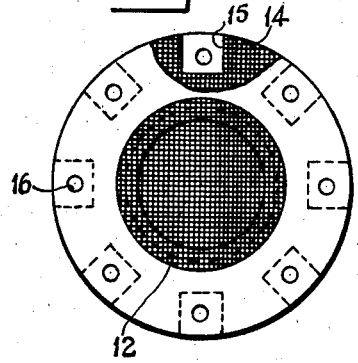
Figure 2 is a top plan view, partly broken away, of the combined strainer and gasket construction illustrated in Figure 1.
Figure 3:
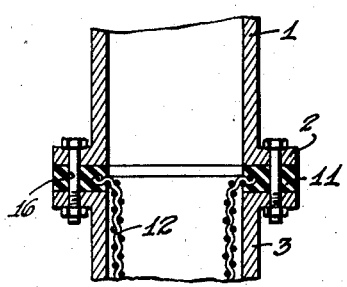
Figure 3 is a view similar to Figure 1, but showing a modification wherein bolts are employed as a clamping means.

The construction illustrated in Figures 1 and 2 is particularly adapted for use in gasoline tanks to replace the various elaborate and expensive fittings such as foot valves on suction pipes and elaborate screen structures on fill pipes, as have formerly been used in these relationships. It is, of course, to be understood that the screen mesh 12 may be formed of any suitable material such as brass, copper, Monel metal or the like, the choice of metals depending upon the fluids to which it is to be exposed. Likewise, where the combined strainer and gasket is to be used with fluids which readily attack and destroy rubber, it is comprehended that materials having the required and desirable resiliency of rubber and, in addition, increased resistance to the attack of fluids to which exposed, may be used instead of rubber. These materials are preferably synthetic rubber or the like, and an additional form which may be taken by the body 11 is a body of rubber provided with a coating which is resistant to the attack of the material with which the structure is used, such as synthetic rubber.

The resilient annulus or body 11, in addition to performing the function of making tight the joint between the conduit or connection members 1 and 3, also resiliently supports the screen 12; and, in addition, resiliently insulates the mesh 12 from the metallic members 1 and 3, whereby to prevent crushing of the edge portions of the mesh and to prevent friction between these edge portions and the adjacent portions of the sections 3 and 4, due to bending of the mesh 1 upon passage therethrough of pulsating fluids. Such friction occurring between moving metallic bodies is extremely dangerous, where volatile fluids are handled, because such static electricity as may be formed by such friction may cause disastrous explosions. Such friction will likewise be prevented from occurring upon instantaneous shock being imparted to the mesh due to the striking thereagainst of solid matter in the fluids passing therethrough.

The fineness or gauge of the mesh will, of course, be particularly chosen for the relation for which the strainer is adapted and the fluids adapted to be strained thereby. Provision of the aperture 16 to cooperate with the lower surface of the flange 2 and the upper surface of the step 4 to form arcuately spaced air cushions is an extremely important feature of this invention, because such provision greatly increases the resiliency of the connection between the members 1 and 3 and also increases the resistance to relative rotary movement between the member 7 and the adjacent and abutting flange 2, as well as preventing relative rotation between the members 1 and 3. While the mesh or strainer member, as illustrated, is cup-shaped, it is, of course, to be understood that it may be conical, flat or formed in any shape which may be preferred.

The metal mesh 12 illustrated in Figures 1 and 2 is preferably provided with openings of such size as to strengthen the rubber or rubber equivalent without reducing the resiliency of the rubber to thus reinforce the rubber and prevent "cold flow" thereof. By my construction, the effectiveness of the rubber gasket is maintained, while the novel advantage of having the same mesh act both as strainer and as reinforcement for the rubber gasket is obtained.

It will be understood that the above described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. An article of manufacture for use as a combined screen and gasket in a metallic conduit connection comprising a cup-shaped screen member of metal mesh provided with flanges having cut-away edge portions, said flanges being imbedded in a resilient annulus vulcanized thereto, said annulus having holes therein extending through the cut-away portions in the flanged portion of said screen member.

2. In combination, an annular rubber body, a metal mesh strainer member having an annular flange imbedded in said annular rubber body and provided with cut-away marginal portions, said rubber body having spaced apertures extending therethrough, aligned with the cut-away portions of said annular flange and spaced inwardly of the edges of the cut-away portions of said flange, whereby bolts extending through said apertures are insulated from the edges of the cut-away portions of said annular flange by the material of said annular rubber body.

ABRAHAM LINCOLN FREEDLANDER.